July 7, 1936.   H. LEWINSOHN ET AL   2,046,393
ILLUMINATED MIRROR
Filed July 5, 1934    3 Sheets-Sheet 1
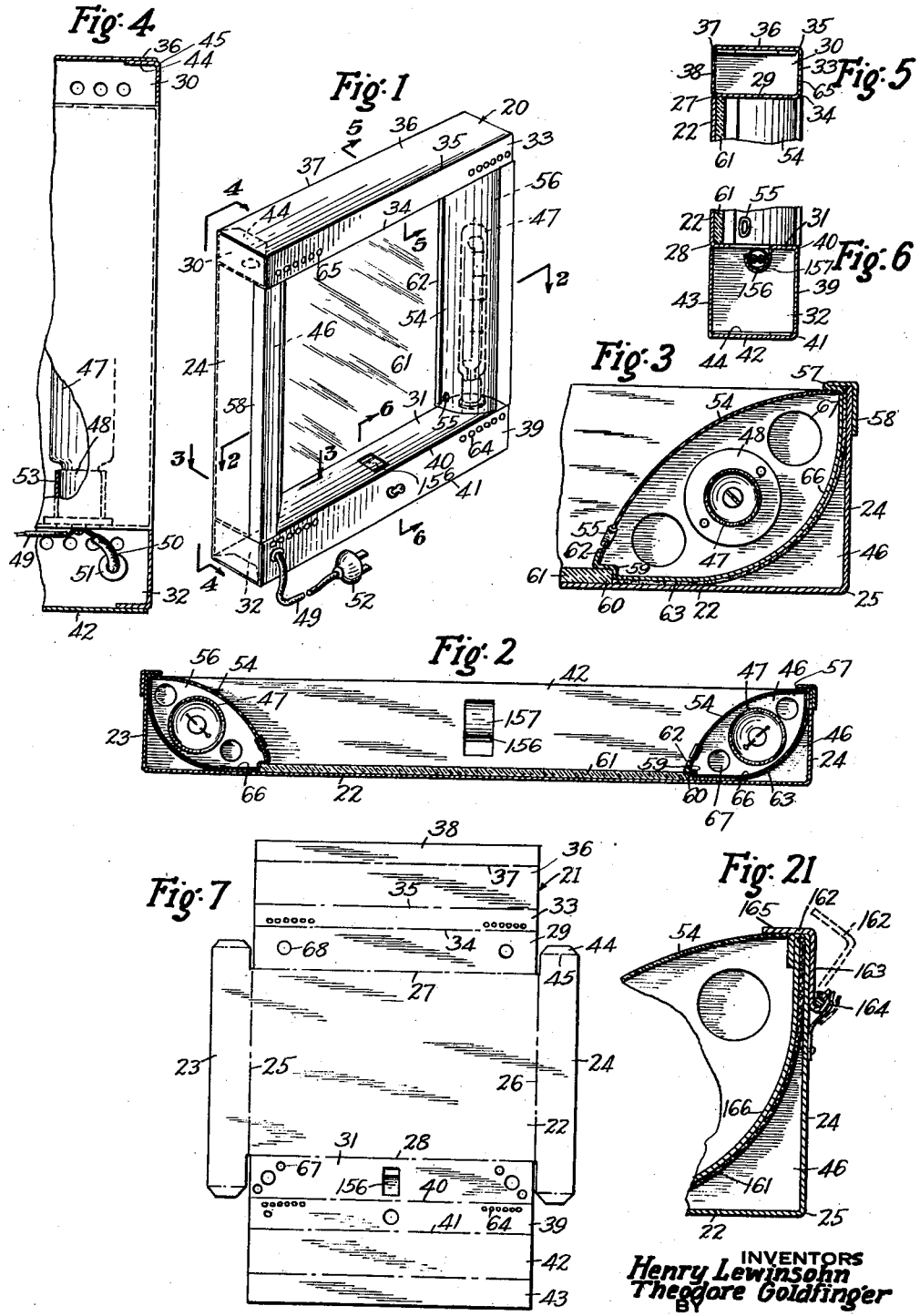
INVENTORS
Henry Lewinsohn
Theodore Goldfinger
BY
ATTORNEY July 7, 1936.     H. LEWINSOHN ET AL     2,046,393
ILLUMINATED MIRROR
Filed July 5, 1934     3 Sheets-Sheet 2
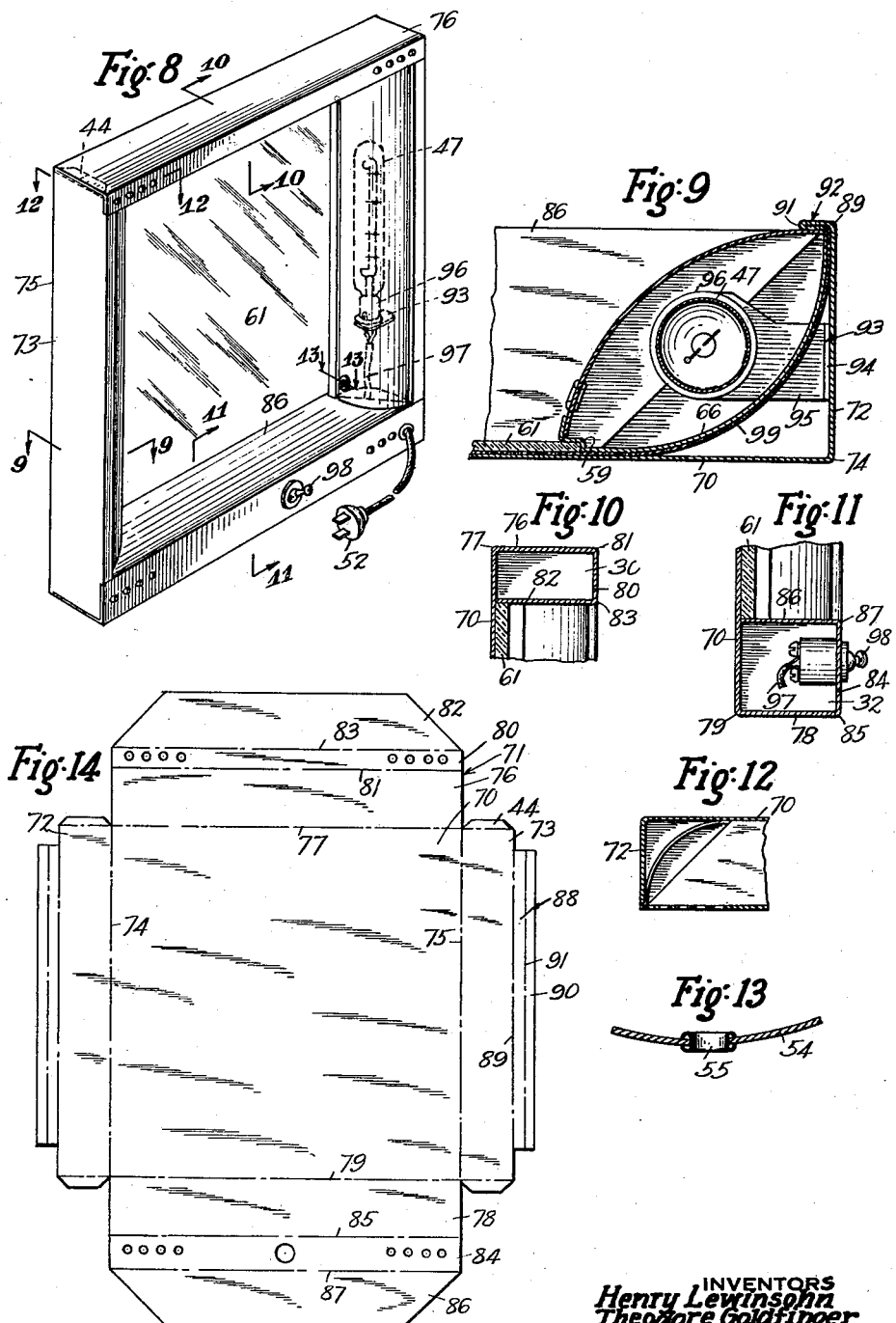
INVENTORS
Henry Lewinsohn
Theodore Goldfinger
BY
ATTORNEY

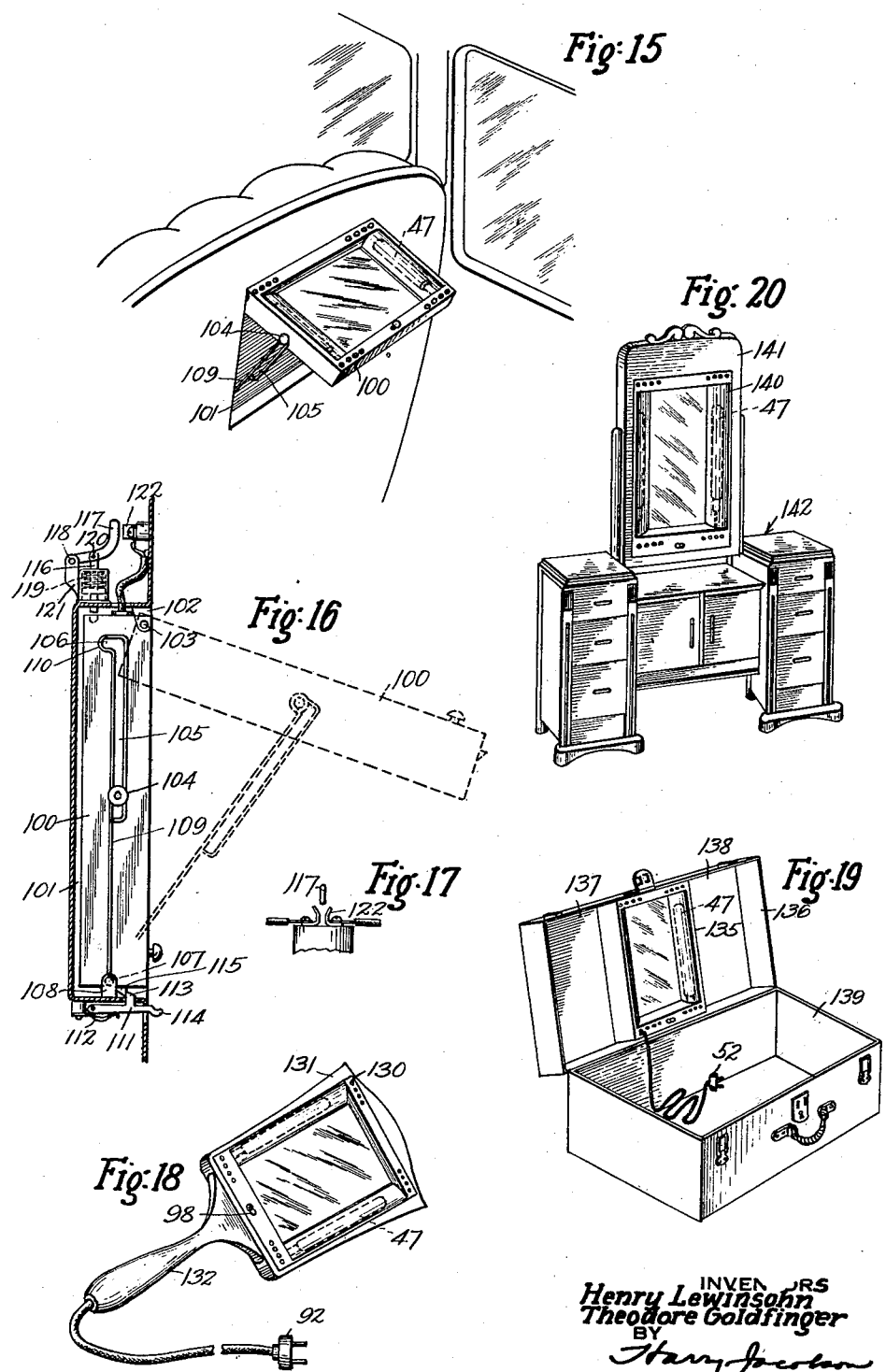

Patented July 7, 1936

2,046,393

UNITED STATES PATENT OFFICE 2,046,393

ILLUMINATED MIRROR

Henry Lewinsohn and Theodore Goldfinger, New York, N. Y.

Application July 5, 1934, Serial No. 733,782

13 Claims. (Cl. 240—4.1)

This invention relates to illuminated mirrors and particularly to that type constituting a self-contained unit.

The invention contemplates the provision of a self-contained mirror unit assembled with its frame and control means, ready for use, and adapted to be manufactured economically in large quantities and, if desired, to be later fitted into a recess in the place or in the article in connection with which the mirror is to be used.

The invention further contemplates the provision of an illuminated mirror unit wherein the heat generated by the lighting lamps cannot adversely affect the remaining parts of the unit nor the device with which the unit may be assembled.

The invention further contemplates the provision of an illuminated mirror unit comprising a minimum number of parts readily accessible for replacement or repair.

The invention further contemplates various combinations of the self-contained illuminated mirror unit with mirrored articles peculiarly useful in connection with such a unit, as for example, the dash board or back of a seat or wall of an automobile, a make-up box for use in theatres, hotels and other places where the lighting may be inadequate, in hand mirrors and in articles of furniture, such as wall cabinets, dressing tables, dressers, vanity tables and the like.

The various objects of the invention will be clear from the description which follows and from the drawings:

Fig. 1 is a perspective view of a simplified form of the mirror unit adapted for use in connection with an easel or to be set into a wall or other article.

Fig. 2 is a horizontal section of the same on an enlarged scale taken on the line 2—2 of Fig. 1.

Fig. 3 is a similar section taken on the line 3—3 of Fig. 1.

Fig. 4 is a fragmentary vertical section taken on the line 4—4 of Fig. 1.

Fig. 5 is a similar section taken on the line 5—5 of Fig. 1.

Fig. 6 is a similar section taken on the line 6—6 of Fig. 1.

Fig. 7 is an elevational view of the blank from which the frame of our new unit is made.

Fig. 8 is a perspective view similar to Fig. 1 of a modified form of our invention.

Fig. 9 is a horizontal section similar to Fig. 3, and taken on the line 9—9 of Fig. 8.

Fig. 10 is a vertical section taken on the line 10—10 of Fig. 8.

Fig. 11 is a similar section taken on the line 11—11 of Fig. 8.

Fig. 12 is a horizontal section taken on the line 12—12 of Fig. 8.

Fig. 13 is a similar section taken on the line 13—13 of Fig. 8.

Fig. 14 is an elevational view similar to Fig. 7 of the blank from which the frame of the unit shown in Fig. 8 is made.

Fig. 15 is a perspective view of our improved unit showing said unit arranged in its operative or open position in the back of a seat of an automobile.

Fig. 16 is a vertical section of a dash board, wall, or seat of an automobile showing the arrangement of our improved unit therein, and showing further the means of controlling the illumination of the unit when the unit is moved into its operative position shown by the dotted lines.

Fig. 17 is an elevational view of the switch for controlling the illumination of the unit shown in Fig. 16.

Fig. 18 is a perspective view of a hand mirror embodying our invention.

Fig. 19 is a perspective view of a make-up box embodying our invention.

Fig. 20 is a similar view of a vanity table or dresser embodying our invention.

Fig. 21 is a fragmentary horizontal section similar to Fig. 3 of a modified form of the support for the closure of the light compartment.

It will be understood that either of the units shown in Figs. 1 to 7 inclusive or in Figs. 8 to 15 inclusive may be used by themselves, or with an easel, or in connection with a considerable number of widely different articles wherein a mirror would be useful, and as is shown, for example, in Figs. 15 to 20 inclusive. We, therefore, do not wish to be understood as limiting ourselves to the articles shown in Figs. 15 to 20 since we contemplate the use of the unit for other articles adapted to be supplied with mirrors, such as medicine and wall cabinets, doors and the like.

In the practical embodiment of our invention shown by way of example in Figs. 1 to 7 inclusive, the frame 20 is preferably made of a single sheet of suitable material such as the blank 21 of Fig. 7. Said material may be sheet metal, fiber, or any other material adapted to form a substantially rigid box or frame when bent up into its final form and suitably connected at the joints thereof. The back 22 of the frame is preferably integrally joined with the sides 23 and 24, said sides being bent at right angles to the back along the respective dash dot fold lines 25 and 26.

The back 22 terminates, however, at the upper fold line 27 and the lower fold line 28, at which the material constituting the respective upper and lower compartments are first bent to form said compartments. As clearly shown in Fig. 5, the horizontal wall 29 is bent forwardly from the back along the fold line 27 to form the bottom wall of the ventilating compartment 30. Similarly, the flap 31 is bent along the fold line 28 to form the upper wall of the lower wiring compartment 32 (Fig. 6). The flap 33 between the fold lines 34 and 35 forms the front wall of the ventilating compartment, the flap 36 between the fold lines 35 and 37 forming the top of said compartment. The flap 38 between the fold line 37 and the adjacent peripheral edge of the blank forms the back wall of said compartment. Similarly, the flap 39 of the blank between the fold lines 40 and 41 forms the front wall of the wiring compartment 32, the flap 42 forming the bottom of said compartment and the flap 43 forming the rear wall of said compartment.

It will be noted that the sides 23 and 24 forming the side wall of the frame are coextensive with the height of the entire frame including both compartments. Each of the sides terminates in a suitable flap as 44 at its upper and lower ends, said flap being designed to be bent about the fold line 45. The upper flaps 44 when bent are suitably secured to the under surface of the wall 36 as by means of soldering, spot welding, screws, rivets or other suitable fastening means. The corresponding flaps at the bottom of said sides are similarly designed after being bent, to be similarly secured to the upper surface of the wall 42 forming the bottom of the wiring compartment 32. It will thus be seen that the entire frame constituting the back, the sides and an upper and lower compartment is conveniently bent from a single blank.

Additional side compartments as 46 and 56 each containing a lighting source or lamp 47 are provided in the frame, each of said additional compartments being formed in part by a side of the frame and part of the adjacent portion of the back. The lamps 47 are removable so that any type of lamp may be employed, such as one adapted to be energized by a suitable battery such as a dry battery or a storage battery of the kind employed in automobiles, or the type adapted to be energized by the ordinary house current. The socket 48 of each lamp is suitably secured by suitable screws, bolts, spot welding, or the like, to the upper wall 31 of the wiring compartment and is insulated therefrom by suitable means, or a porcelain receptacle may be used. At the lower end of the lamp, a bayonet lock connection or screw connection may be made with the lamp socket or receptacle. Suitable properly insulated wires 49, 50 are arranged in the wiring compartment 32 and are electrically connected to the sockets for the lamps, the wire 50 passing through a suitably insulated bushing 51 of fiber or rubber in the front wall 39 of the wiring compartment, and being secured to a suitable conducting plug 52 of the usual type, whereby the lamps may readily be energized from a convenient wall outlet.

In order to prevent any possibility of the occurrence of short circuits, it will be understood that the wiring 49, 50 is arranged in the wiring compartment 32 and preferably adjacent the upper wall 31 thereof. As shown in Fig. 1, part of the material of the top wall 31 of the wiring compartment may be bent downwardly and rearwardly to form the wire holding member 156, carrying a suitable insulating clip 157 of fiber or the like to hold the wires.

The socket 48 is further insulated from possibility of electrical contact with any other part of the compartment by means of a cylindrical insulating bushing as 53, whereby should the socket become loose, it will nevertheless fail to short circuit against the frame.

As best shown in Fig 3, the side compartments 46 and 56 are each closed at the front thereof by means of a suitable translucent sheet as 54, removably held in place by means soon to be described. Said sheet is preferably made of suitable well-known non-inflammable and heat resisting material such as an acetate composition, being flexible and sufficiently resilient to tend to assume a flat position after it has been bent out of that position. When in place, the sheet 54 is bulged convexly, and owing to its inherent resiliency, is self maintained in place against its holding means. At a convenient point, an eyelet as 55 is secured in a suitable perforation in the sheet 54 whereby it may be sprung out of its holding means to open the compartment at its front and thereby to provide access to the lamp and socket. It will be understood, however, that the sheet 54 may be made of any suitable heat resisting material, such as glass or the like, if desired. In any case, the holding flange for the sheet may be made of a separate piece of material removably secured to the side of the frame (Fig. 21) in a manner later to be described.

In order to direct the light from the lamp toward the face of the user, a suitable reflector as 66 may be optionally provided at the rear of the compartment 46 or 56. As shown in Fig. 3, said reflector comprises a metallic, suitably coated and polished sheet bent at its front edge to form the doubled inwardly projecting flange 57 and provided with a terminal portion 58 secured to the side walls 23 or 24 of the frame in any suitable manner as by means of spot welding, soldering or other well-known fastening means. Adjacent its other edge, the reflector is bent to form a right angle portion 59 for the reception of the peripheral portion 60 of the mirror 61, it being understood that the mirror is held in place adjacent the back 22 by means of the right angled portions 59 of the reflectors.

The inner peripheral edge portion 62 adjacent the portion 59 of the reflector 66 is bent forwardly and slightly outwardly to provide a flange against which the translucent member 54 abuts by reason of its inherent resiliency. It will be understood that said member 54, when made of acetate or the like non-inflammable and resilient material, may readily be removed by a suitable elongated instrument inserted through the eyelet 55 and serving to pry said member out from its contact with the flanges 57 and 62.

It will further be understood that the reflector 66 may be entirely omitted if desired, and that the flange 57 may be formed from a frame part as is clearly shown in Fig. 9. Since the use of the reflector is optional, the means for reflecting the light from the lamp toward the user may constitute the inner surfaces of the sides 23 and 24 and the adjacent outer portions of the back 22, which may be suitably plated and/or polished for that purpose.

Since it is intended, in some cases, that the illuminated mirror unit be used in connection with other articles, it becomes advisable to insure that the heat generated by the lamps does not adversely affect said other articles, particularly when they are assembled by means of glue, or are painted, or are made of materials affected by heat. Toward this end, a sheet 63 of suitable heat insulating material, such as asbestos or the like, is interposed between the reflector 66 and the adjacent frame parts. Said sheet may extend, if desired, throughout the entire width of the frame and may be interposed between the mirror and the back 22 as shown in Fig. 9 particularly when the mirror is made of glass or the like, to prevent transfer of the heat generated by the lamps between the frame and the adjoining parts.

Means are further provided for ventilating the side compartments 46 and 56, as shown particularly in Figs. 1 and 4. Said means takes the form of a series of apertures 64 made optionally in the front wall 39 of the wiring compartment 32 and a similar series of apertures 65 made in the front wall 33 of the ventilating compartment 30. To insure air circulation between the compartment 32 and the adjacent side compartments 46 and 56, suitable apertures as 67 are made in the upper wall 31 of said compartment 32 adjacent the opening provided for the socket 48. Similarly, apertures as 68 are made in the lower wall 29 of the ventilating compartment 30. The apertures 64 and 67 may, however, be omitted if desired. It will be seen that heated air may leave the side compartment through the apertures 68 and 65, drawing cooler air through the apertures 64 and 67 into the side compartment where the latter apertures are provided, and thereby cooling said compartment and preventing overheating of the surrounding parts.

Referring now to the form of our invention shown in Figs. 8 to 14 inclusive, the back 70 of the blank 71 (Fig. 14) is made of the entire height and the entire width of the frame, whereby the frame is entirely closed at the back and may be used as an indepedent unit in connection with a suitable easel hinged to the back and similar to those used in connection with picture frames and the like, which easel being of a type well known, needs no further description nor illustration. The sides 72 and 73 of the blank are folded at right angles to the back 70 on the respective fold lines 74 and 75 to form the sides of the frame. The flap 76 of the blank is similarly folded along the fold line 77 to form the upper wall of the ventilating compartment 30. Similarly the flap 78 of the blank is inwardly folded along the fold line 79 to form the lower wall of the wiring compartment 32. At the ends of the sides 72 and 73 are provided short securing flaps 44, which flaps being similar to those described in connection with Fig. 7, need not be again described in detail. Extending from the flap 76 is the flap 80, which, when folded downwardly on the fold line 81, forms the front wall of the ventilating compartment, the adjacent flap 82, when folded at the line 83, forming the bottom wall of said compartment. Similarly, the flap 84 when folded upwardly at the fold line 85 forms the front wall of the wiring compartment, while the flap 86 when folded inwardly on the fold line 87 forms the top wall of said wiring compartment. Said flaps 82 and 86 are cut off or beveled at their ends (Fig. 12) to permit air to circulate between the various compartments and thereby to prevent overheating.

As has been hereinbefore indicated, the flange 57 may be formed from the material itself. In such case, an extension flap 88 is provided on each of the sides 72 and 73, adapted to be folded along the fold line 89 inwardly, the adjacent similar flap 90 being folded outwardly on to the flap 88 about the fold line 91 to form the doubled flange 92 (Figs. 9 and 14).

In Fig. 8 we have shown a modified form of the means for supporting the lamps 47. Said means takes the form of a bracket 93 having a leg as 94 secured to the side wall of the frame and having a horizontally disposed leg 95 passing through the reflector 66 and supporting the lamp socket 96. It will be understood that the socket 96 is suitably insulated from the frame and from the surrounding metallic parts. One set of the wires or conductors 97 lead to the switch 98 preferably arranged at the center of the front wall 84 of the wiring compartment, another set of wires leading to the plug 52 in a manner which will be obvious, whereby said switch 98 controls the lighting of the lamps.

As shown in Fig. 9, the sheet 99 of asbestos or other suitable heat-insulating and cushioning material, is arranged behind the reflectors 66 and behind the mirror 61, though it will be understood that if the reflectors 66 are omitted, then the sheet of asbestos is arranged on the entire area of the back 71 and the sides 72 and 73 to prevent breakage of the mirror or other fragile parts on rough handling of the unit. The mirror, however, may be made of glass or polished metal as may be found convenient.

In Fig. 21, we have shown a form of construction designed to permit ready removal of the sheet 54, particularly when said sheet is made of comparatively rigid material such as glass or the like. The side 24 is there bent as at 160 about the forward ends of the reflector 166, and the cushioning and heat-insulating sheet 161. A separate piece of material 162 is provided with a flange 163 which is pivotally mounted on the side 24 by means of a suitable spring hinge 164 tending to maintain the part 162 in its normal position to enable the flange 165 thereof to hold the sheet 54 in place. To remove the sheet, the part 162 is swung toward the dotted line position shown in Fig. 21 against the action of the spring hinge, thereby releasing the sheet for easy removal.

Referring now to Figs. 16 and 17, wherein is shown the illuminated mirror unit 100 arranged for convenient use in an automobile, said unit may be secured to the dashboard in a suitable recess or opening therein, such as is now customarily used for the arrangement of a radio set or the like, or may be secured in a back of the front seat, or in a recess in one of the walls. The unit 100 is preferably pivotally secured in the recess 101 of the dashboard, seat, or wall, by any suitable means such as the bracket 102 and pivot pins 103, and normally occupies a position within the recess, in which position the lamps are not lighted. Means are provided, however, for automatically energizing the lamps 47 of the unit when said unit is swung to its operative position shown by the dotted line of Fig. 16, in which position the occupant of the vehicle may use the mirror for toilet or other purposes. A headed pin 104 is secured to each of the side walls of the unit and passes through a slot or elongated opening 105 in the holding member 109. Said member is pivoted at its lower end as at 107 to a suitable bracket 108 arranged in the bottom of the recess 101. At its upper end, the opening 105 is widened transversely as at 106, whereby as the unit 100 is swung on its pivot, the pin 104 moves in the opening 105 until it reaches the widened part 106, and comes to rest against the closed end 110.

To swing the unit back into the recess 101, the member 109 is first swung rearwardly about its pivot 107 to carry the pin 104 into the elongated opening 105, whereafter the unit is released and drops back toward the recess, the pin at this time moving in the opening 105. A suitable pivoted spring latch, comprising a spring pressed pivot member 111 urged upwardly by the spring 112 and including the latch projection 113, is arranged so that the finger piece 114 thereof projects from the recess. The unit 100 carries a downwardly projecting lug 115 adapted to engage the projection 113 in the normal position of the unit in the recess, thereby to lock the unit in place against vibration and displacement. It will be understood that the finger member 114 is pressed downwardly to release the engagement of the projection 113 from the lug 115, when the unit is to be moved into its extended position.

The means for energizing the lamps 47 on the extension of the unit will now be described. As shown, said means comprises the switch operating arm 116 pivoted to the switch blade 117 as at 120 and urged downwardly by the spring 119 acting on a collar on said arm. The blade 117 is in turn pivoted to the arm 121 as at 118 and is normally urged into engagement with its cooperative switch blades 122 to close the circuit to the lamps. In the normal position of the units 100, the arm 116 is engaged by the upper surface of the unit and pressed upwardly against the action of the spring 119 to rotate the blade 117 out of engagement with the switch blades 122. When, however, the unit is swung about its pivot 103 into its extended position, the arm 116 is released and is acted upon by the spring 119 to move it downwardly and thereby to swing the switch blades into engagement and to close the switch to the lamps, whereby the lamps are automatically illuminated. On the reverse movement of the unit, the arm 116 is again raised to open the switch.

As has been heretofore pointed out, the illuminated mirror unit is so constructed that it may be arranged in numerous other articles for use therein. As shown in Fig. 18, the unit 130 is shown in connection with a hand mirror, being set into a suitable frame 131, suitably recessed for the reception of the unit. The wiring from the plug 92 is in this instance preferably passed through the handle 132 of the hand mirror, whereby on the closing of the switch 98 the lamps 47 of the unit are energized to illuminate the face of the user.

As shown in Fig. 19, the unit 135 is secured in the recess of a cover 136 of a make-up box, overnight bag or other luggage, thereby forming compartments 137, 138 in the cover on opposite sides of the unit. The plug 52 and the wiring thereto may be permitted to lie in the container portion 139 of the bag or may be arranged in a suitable compartment designed for that purpose, if desired. It will be understood that the cover 136 swings back just far enough to hold the mirror in the proper position for use when the container part 139 is laid on a table or other suitable support.

In Fig. 20, there is shown the unit 140 arranged in a recess of the frame 141 of a dressing table 142, vanity table, dresser or the like article of furniture in a manner which will now be obvious.

From the foregoing, it will be seen that we have provided an illuminated mirror unit comprising a minimum number of parts and adapted to be used by itself or in connection with other articles into which the unit is set, in substantially the same manner as a mirror alone would be employed; that our improved unit is adapted for a wide range of utility and for use in a great variety of different articles, and that we have provided an illuminated mirror unit well adapted to meet the severe requirements of practical use.

While we have shown and described certain specific embodiments of our invention, we do not wish to be understood as limiting ourselves thereto, but desire to claim our invention as broadly as may be permitted by the state of the prior art and the scope of the appended claims.

We claim:

1. An illuminated mirror unit comprising a frame bent from a one-piece sheet and provided with a back, sides, a top wall and a bottom wall, an apertured ventilating compartment at the upper end of the frame, said top wall forming the top of said compartment, an apertured wiring compartment at the bottom of the frame, said bottom wall forming the bottom of said wiring compartment, a mirror arranged adjacent and in front of the back and of less width than the frame, and a lamp compartment formed by part of the back and a side of the frame at each side of the mirror, and a light-pervious removable closure for the front of the lamp compartment, said ventilating and wiring compartments communicating with each other through apertures in the lamp compartment.

2. A mirrored article provided with a walled recess open at its front for the movable reception of a mirror unit, said unit being substantially coextensive with and normally closing the front of the recess and including a mirror and means for illuminating the face of the user of the mirror, means within the recess and movable with the unit out of the recess for supporting the unit in all positions thereof, and means including a switch for automatically energizing the illuminating means when the unit is moved out of the recess into operative position.

3. In an illuminated mirror unit, a one-piece frame, side compartments formed in the frame, a lamp in each of the side compartments, an upper ventilating compartment communicating with the side compartments, a mirror between the side compartments, a light-pervious closure for the front of each of the side compartments, and flange means for engaging the longitudinal edge of the closure and removably holding the closure in place.

4. In an illuminated mirror unit, a mirror, a lighting compartment on each side of the mirror, a lamp in the compartment, means including an apertured wall closing the upper end of the compartment, a heat insulating sheet interposed between the lamp and the side and back of the compartment to prevent said side and back from becoming heated by the lamp and a flexible, light-pervious closure for the front of the compartment.

5. In an illuminated mirror unit, a mirror, a lighting compartment substantially triangular in cross-section at a side of the mirror, a cushioning and heat insulating sheet covering two sides of the compartment and a light-pervious, non-inflammable, flexible and resilient sheet removably held in place to form the third side of the compartment.

6. In an illuminated mirror unit, a mirror, a lighting compartment at a side of the mirror, a light-pervious, non-inflammable, flexible and resilient sheet forming a removable closure for the compartment, and means at one edge of the lighting compartment for holding the mirror and one edge of the sheet in place, and means at the other edge of the lighting compartment for removably holding the sheet in place.

7. An illuminated mirror unit comprising a frame bent from a one-piece sheet and comprising an upper apertured ventilating compartment bent from the sheet, a lower wiring compartment bent from the sheet, a side wall of each of a pair of lighting compartments bent from the sheet and outstanding substantially at right angles from each edge of the back of the frame, a light-pervious closure for the lighting compartment extending from the front edge of each of the side walls toward the back of the frame, and a heat insulating lining for the lighting compartments.

8. In an illuminated mirror, a frame, a lighting compartment in the frame, a heat insulating and cushioning lining for the compartment, means for ventilating said compartment including an apertured front wall of the frame providing communication between the outer air and said compartment, and a flexible, removable, light-pervious closure for the compartment.

9. In an illuminated mirror, a one-piece frame bent to form a pair of spaced upright lighting compartments, and a horizontally disposed ventilating compartment communicating with the lighting compartments, and having a bottom wall overhanging the lighting compartments and an apertured front wall, and a mirror arranged between the lighting compartments and below the ventilating compartment.

10. In an illuminated mirror unit, a frame, a mirror carried by the frame, a pair of lighting compartments in the frame one on each side of the mirror, a ventilating compartment arranged transversely of and above the lighting compartments and communicating therewith, a wiring compartment parallel to the ventilating compartment and below the lighting compartments, an asbestos sheet lining the walls of each of the lighting compartments, and a removable light-pervious closure for the front of each of the lighting compartments.

11. The combination with a recessed wall of an automobile, of an illuminated mirror unit including lighting means, means for pivotally mounting said unit for movement into and out of the recess of the wall, and means responsive to the movement of the unit out of the recess to energize the lighting means.

12. The combination with a recessed wall of a mirrored article, of an illuminated mirror unit including lighting means, and means for movably securing the unit in the recess of said wall, and means for supporting the unit when moved into its operative position.

13. In an illuminated mirror, a frame member bent from a single piece of sheet material to provide an upper ventilating compartment having an apertured front wall, a mirror carried at the back of the frame, said member being open at the front thereof to expose the mirror, a sheet of translucent material arranged to extend from the front face of the mirror to the front edge of the frame and thereby providing a lighting compartment behind said sheet, a lamp in the lighting compartment, means to hold the sheet removably in place, said lighting compartment communicating by an aperture therein with the ventilating compartment and communicating with the outer air through the apertures in the front wall of said compartment.

HENRY LEWINSOHN.
THEODORE GOLDFINGER.